(12) United States Patent
Pervan et al.

(10) Patent No.: US 7,811,489 B2
(45) Date of Patent: Oct. 12, 2010

(54) RECYCLING OF LAMINATE FLOORINGS

(75) Inventors: Darko Pervan, Viken (SE); Kent Lindgren, Perstorp (SE); Jan Jacobsson, Landskrona (SE); Niclas Håkansson, Viken (SE); Eddy Boucké, Kortrijk (BE); Göran Ziegler, Viken (SE)

(73) Assignee: Valinge Innovation AB, Viken (CH)

( * ) Notice: Subject to any disclaimer, the term of this patent is extended or adjusted under 35 U.S.C. 154(b) by 0 days.

(21) Appl. No.: 12/270,051

(22) Filed: Nov. 13, 2008

(65) Prior Publication Data

US 2009/0145066 A1 Jun. 11, 2009

Related U.S. Application Data

(60) Provisional application No. 60/988,990, filed on Nov. 19, 2007.

(51) Int. Cl.
*B27N 3/00* (2006.01)
(52) U.S. Cl. .................. 264/115; 264/913; 264/914
(58) Field of Classification Search ............... None
See application file for complete search history.

(56) References Cited

U.S. PATENT DOCUMENTS

| | | | |
|---|---|---|---|
| 3,032,820 A | 5/1962 | Johnson | |
| 3,673,020 A | 6/1972 | De Jaeger | |
| 3,846,219 A | 11/1974 | Kunz | |
| 4,131,705 A | 12/1978 | Kubinsky | |
| 5,034,272 A | 7/1991 | Lindgren et al. | |
| 5,422,170 A | 6/1995 | Iwata et al. | |
| 5,569,424 A * | 10/1996 | Amour | 264/115 |
| 5,925,296 A * | 7/1999 | Leese | 264/70 |
| 7,022,756 B2 | 4/2006 | Singer | |
| 2001/0009309 A1 * | 7/2001 | Taguchi et al. | 264/115 |
| 2002/0100231 A1 * | 8/2002 | Miller et al. | 52/177 |
| 2003/0056873 A1 | 3/2003 | Nakos et al. | |
| 2004/0191547 A1 | 9/2004 | Oldorff | |
| 2004/0202857 A1 | 10/2004 | Singer | |
| 2006/0032175 A1 | 2/2006 | Chen et al. | |
| 2006/0145384 A1 * | 7/2006 | Singer | 264/122 |
| 2006/0183853 A1 | 8/2006 | Sczepan | |
| 2007/0184244 A1 | 8/2007 | Doehring | |
| 2007/0207296 A1 | 9/2007 | Eisermann | |
| 2007/0218260 A1 | 9/2007 | Miclo et al. | |

(Continued)

FOREIGN PATENT DOCUMENTS

CH 298894 A 5/1954

(Continued)

OTHER PUBLICATIONS

Floor Daily, "Shaw Laminates: Green by Design", Aug. 13, 2007, 1 page, Dalton, GA.

(Continued)

*Primary Examiner*—Mary Lynn F Theisen
(74) *Attorney, Agent, or Firm*—Buchanan Ingersoll & Rooney PC

(57) ABSTRACT

Recycling of laminate flooring based on a separation of the panels into particles which are connected with a binder and formed to a new sheet shaped material. A building panel includes a surface layer and a wood fiber based core, and the wood fiber based core includes aluminium oxide particles.

6 Claims, 3 Drawing Sheets

U.S. PATENT DOCUMENTS

| | | |
|---|---|---|
| 2008/0032120 A1 | 2/2008 | Braun |
| 2008/0263985 A1 | 10/2008 | Hasch et al. |
| 2009/0155612 A1 | 6/2009 | Pervan et al. |
| 2010/0092731 A1 | 4/2010 | Pervan et al. |

FOREIGN PATENT DOCUMENTS

| | | |
|---|---|---|
| DE | 7148789 U | 4/1972 |
| DE | 33 34 921 A1 | 4/1985 |
| DE | 42 36 266 A1 | 5/1993 |
| DE | 202 14 532 U1 | 2/2004 |
| DE | 20 2004 003 061 U1 | 8/2005 |
| DE | 20 2006 007 797 U1 | 8/2006 |
| DE | 10 2005 046 264 A1 | 4/2007 |
| DE | 10 2006 024 593 A1 | 12/2007 |
| EP | 0 129 430 B1 | 1/1990 |
| EP | 0 744 477 B1 | 11/1996 |
| EP | 0 914 914 A2 | 5/1999 |
| EP | 1 454 763 A2 | 9/2004 |
| EP | 1 498 241 A2 | 1/2005 |
| EP | 1 584 378 A1 | 10/2005 |
| EP | 1 681 103 A2 | 7/2006 |
| EP | 1 690 603 A1 | 8/2006 |
| EP | 1 985 464 A1 | 10/2008 |
| EP | 1 997 623 A1 | 12/2008 |
| FR | 2 873 953 A1 | 2/2006 |
| GB | 984170 | 2/1965 |
| JP | 2-229002 A | 9/1990 |
| JP | 11-291203 A | 10/1999 |
| JP | 2003-311717 A | 11/2003 |
| JP | 2003-311718 A | 11/2003 |
| JP | 2005-170016 A | 6/2005 |
| JP | 2005-219215 A | 8/2005 |
| SE | 469 326 B | 6/1993 |
| WO | WO 00/22225 A1 | 4/2000 |
| WO | WO 01/64408 A1 | 9/2001 |
| WO | WO 03/095202 A1 | 11/2003 |
| WO | WO 2004/042168 A1 | 5/2004 |
| WO | WO 2005/054600 A1 | 6/2005 |
| WO | WO 2009/065768 A1 | 5/2009 |
| WO | WO 2009/065769 A2 | 5/2009 |

OTHER PUBLICATIONS

International Search Report mailed Feb. 13, 2009 in PCT/EP2008/065486.

Pervan, et al., U.S. Appl. No. 12/743,423, entitled "Fibre Based Panels With a Wear Resistance Surface," filed May 18, 2010.

Pervan, et al., U.S. Appl. No. 12/741,998, entitled "Recycling of Laminate Floorings," filed May 7, 2010.

Ziegler, et al., U.S. Appl. No. 61/295,514, entitled "Fibre Based Panels With a Decorative Wear Resistance Surface," filed Jan. 15, 2010.

Ziegler, et al., U.S. Appl. No. 61/295,343, entitled "Bright Coloured Surface Layer," filed Jan. 15, 2010.

Ziegler, et al., U.S. Appl. No. 61/295,520, entitled "Heat and Pressure Treated Design," filed Jan. 15, 2010.

Lindgren, et al., U.S. Appl. No. 61/295,350, entitled "Fibre Based Panels With a Decorative Wear Resistance Surface," filed Jan. 15, 2010.

Ziegler, U.S. Appl. No. 61/323,463, entitled "Powder Overlay," Apr. 13, 2010.

Pervan, et al., U.S. Appl. No. 61/323,573, entitled "Fibre Based Panels With a Decorative Wear Resistance Surface," filed Apr. 13, 2010.

* cited by examiner

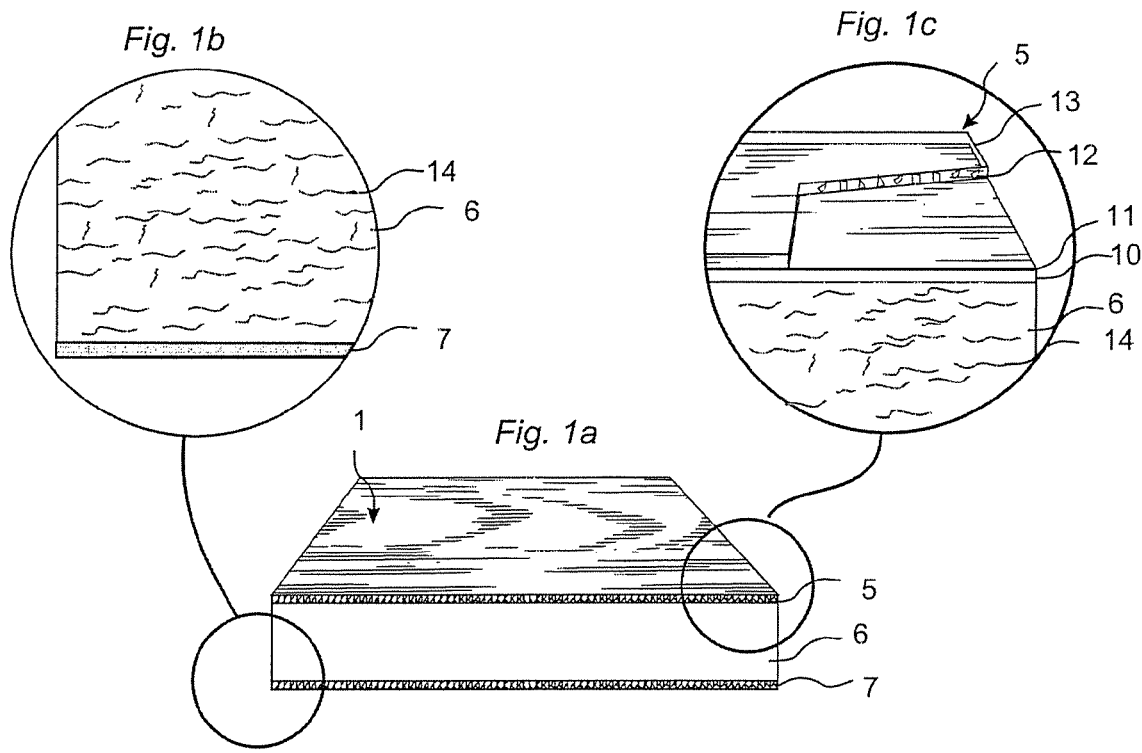
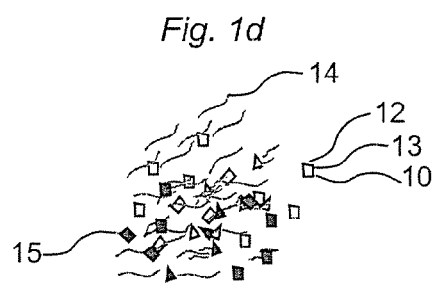
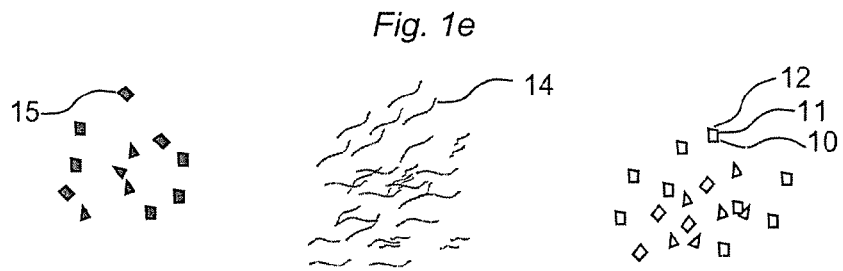

RECYCLING OF LAMINATE FLOORINGS

PRIORITY

The present application claims priority to U.S. Ser. No. 60/988,990, filed on 19 Nov. 2007, which is incorporated herein in its entirety.

AREA OF DISCLOSURE

The disclosure generally relates to the field of recycling wood fiber based panels, especially laminate floorings. The disclosure provides new sheet materials and methods to produce such materials.

BACKGROUND OF THE DISCLOSURE

In particular, yet not restrictive manner, the disclosure concerns recycling of sheet shaped panels comprising wood fibers, especially laminates floorings. However, the disclosure is as well applicable to building panels in general. The present disclosure is particularly suitable for use in floating floors, which are formed of floorboards which are made up of one or more preferably moisture-proof upper layers of decorative laminate or decorative plastic material, an intermediate core of wood-fiber-based material or plastic material and preferably a lower balancing layer on the rear side of the core.

The following description of known techniques, problems of known systems and objects and features of the disclosure will therefore, as a non-restrictive example, be aimed above all at this field of application and in particular laminate flooring. However, it should be emphasized that the disclosure can be used in optional floorboards where the floorboards preferably have a core and at least one surface layer, The disclosure can thus also be applicable to, for instance, floors with one or more surface layers of wood, plastic material, flexible fibers such as needle felt or combinations of different materials, for instance wood, plastic, cork, rubber or other materials that are used as surface layers in floors.

BACKGROUND OF THE DISCLOSURE

Laminate flooring usually comprises a core of a 6-12 mm fiberboard, a 0.2-0.8 mm thick upper decorative surface layer of laminate and a 0.1-0.6 mm thick lower balancing layer of laminate, plastic, paper or like material. The surface layer provides appearance and durability to the floorboards. The core provides stability, and the balancing layer keeps the board plane when the relative humidity (RH) varies during the year. The disclosure generally relates to the field of recycling of wood fiber based panels especially laminate floorings. The disclosure provides new sheet materials and methods to produce such materials.

The floorboards are usually laid floating, i.e. without gluing, on an existing sub floor which does not have to be completely smooth or plane. Traditional hard floorboards in floating flooring of this type have usually been joined by means of glued tongue-and-groove joints.

In addition to such traditional floors, which are joined by means of glued tongue-and-groove joints, floorboards have recently been developed which do not require the use of glue and instead are joined mechanically by means of so-called mechanical joint systems. These systems comprise locking means, which lock the boards horizontally and/or vertically.

The main advantages of floating floors with mechanical joint systems are that they can easily and quickly by laid by various combinations of inward angling, snapping-in and displacement along the joint edge. The floorboards can also easily be taken up again and used once more at a different location.

The most common core material is fiberboard with high density and good stability usually called HDF—High Density Fiberboard. Sometimes also MDF—Medium Density Fiberboard—is used as core. As a rule, these core materials are of high quality.

HDF is produced as follows: Roundwood such as for example pine, larch or spruce are reduced to wood chips and then broken down into fibres in a refiner. The fibres are thereafter mixed with a thermosetting binder and then subjected to high pressure and temperature in a press. Fibres are bonded to each other with the cured binder.

DEFINITION OF SOME TERMS

In the following text, the visible surface of the installed floor panel is called "front side", while the opposite side of the floor panel, facing the sub floor, is called "rear side". The sheet-shaped material that comprises the major part of a floor panel is called "core". Then the core is coated with a surface layer closest to the front side and preferably also a balancing layer closest to the rear side, it forms a semi-manufacture, which is called "floor board" or "floor element" in the case where the semi-manufacture, in a subsequent operation, is divided into a plurality of floor elements. Then the floor elements are machined along their edges so as to obtain their final shape with the joint system, they are called "floor panels". By "surface layer" are meant all layers applied to the core closest to the front side and covering preferably the entire front side of the floorboard. By "decorative surface layer" is meant a layer, which is mainly intended to give the floor its decorative appearance. "Wear layer" relates to a layer, which is mainly adapted to improve the durability of the front side.

By "horizontal plane" is meant a plane, which extends parallel to the outer part of the surface layer. By "horizontally" is meant parallel to the horizontal plane and by "vertically" is meant perpendicularly to the horizontal plane. By "up" is meant towards the front face and by "down" towards the rear face.

KNOWN TECHNIQUES AND PROBLEMS THEREOF

The above techniques can be used to manufacture laminate floorings that are highly natural copies of wooden flooring. In recent years, imitations of stones, tiles and the like have become more and more common. All theses advanced designs are much more attractive than the designs produced in the past 20 years and they are sold at very low prices Laminate flooring is very wear resistant and the lifetime could exceed about 15-20 years in a normal home environment. In public areas such as shops, hotels and similar the lifetime could be about 5 years. Laminate floorings are not possible to repair by a sanding of the surface as wood floorings. Many old laminate floors must be replaced soon due to the fact that the surface layer is destroyed. New attractive pattern and the easy way of removing and replacing the floor will also gradually create large volumes of laminate floor that will be disposed just due to the fact that the consumer wants a more attractive floor.

The most common way to dispose or to destruct a laminate floor is to burn the product. This leads to environmental pollution and a considerable waste of raw materials. Even in the case that the floor panels are burned in a process that generates energy and where the gases are cleaned as much as possible, there is a considerable negative effect on the environment. It would be a great advantage if laminate floorings could be recycled and if the fiber based material could be used in a cost effective way to produce other type of materials, preferable a sheet shaped materials.

It is known that fibers could be recycled during the production of a HDF material. It is also known that old floor panels could be used as packaging material. All these applications can not solve the considerable problem of some 100 millions of square meters of laminate floorings that will be disposed annually in the next coming years.

SUMMARY OF THE DISCLOSURE

The present disclosure aims to solve the problem of mainly laminate floorings that must be disposed.

The disclosure is based on a first basic understanding that such floorings should not be destructed in a process that creates gases and that have a negative influence on the environment.

The disclosure is also based on a second understanding that the raw material of a used floor board should be reused preferably completely and that a new multi purpose sheet shaped product should be produced of the raw material of the used floor board. The new multi purpose sheet shaped product could be used as a building panel, preferably as a core, and/or a surface layer and/or a balancing in a new floor panel.

A main objective of the disclosure is to solve the environmental problems of old laminate panels that are intended to be disposed.

According to a first aspect of the present disclosure, there is provided a building panel, which is made of recycled material from an old laminate floor panel, with a surface layer and a wood fiber based core (6), which comprises aluminium oxide particles. The building panel is preferably provided with a balancing layer.

Such a new panel, which is produced from recycled original laminate floor panels of different qualities and material compositions and which comprises all the original materials and chemicals, could have bonding strength, moisture and impact resistance similar to or even better than the original panel. A surprising effect is that the original materials such as aluminium oxide and melamine particles and wood fibers coated or impregnated with cured binders, will not have a negative effect on the properties of the new panel, if such materials are mechanically cut into small particles and mixed with a suitable binder and pressed to a panel.

The mechanical cutting will create particles with rough and increased surface portions. This will increase the bonding strength.

According to a second aspect of the present disclosure, there is provided a method to recycle a used laminate floor panel into a core that could be used to produce building panels. The method includes steps of:

a) Mechanical cutting of the panel into particles
b) Mixing said particles with a binder
c) Pressing the mixed particles and the binder and thereby forming a sheet shaped material.

BRIEF DESCRIPTION OF THE DRAWINGS

The disclosure will in the following be described in connection to preferred embodiments and in greater detail with reference to the appended exemplary drawings, wherein:

FIGS. 1a-e show a cutting of a laminate floor panel into particles;

DETAILED DESCRIPTION OF THE PREFERRED EMBODIMENTS

Figure 2A:
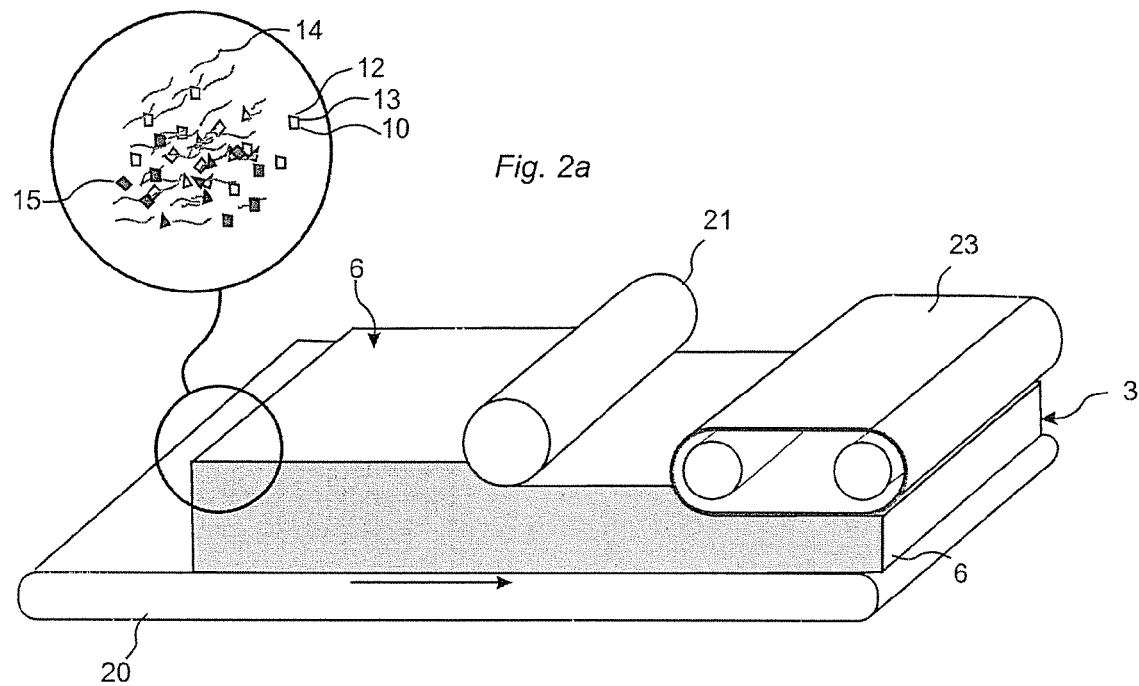
FIGS. 2a-b show a production method of producing a core material comprising recycled materials according to an embodiment of the invention.

FIG. 1a shows a laminated floor panel 1 according to known technology comprising a surface layer 5, a core 6 and a balancing layer 7. FIG. 1c shows the surface layer 5. It has an upper wear layer 13 of a transparent material with great wearing strength. Such a wear layer generally comprises a transparent paper impregnated with melamine resin and with aluminium oxide particles 12 added. A decorative layer 10, comprising of paper with a printed pattern 11 is impregnated with melamine resin and placed under this transparent wear layer 13. The wear layer 13 and the decorative layer 10 are laminated to the core, generally a fiber based core such as HDF, under pressure and heat to an about 0.2 mm thick surface layer 5. FIG. 1b shows the balancing layer 7 that generally also is a melamine impregnated paper. This balancing layer keeps the floor panel flat when humidity varies over time. The transparent wear layer is generally 0.05-0.10 mm thick.

The build up of the used Laminate Floor could vary. Some Laminate Floor has a sound reduction material applied on the backside of the floor. This material could be a different kind of plastic material or other material that can cause blisters or delamination in a new board produced of used Laminate Floor.

Therefore the sound reduction material is preferably removed by a separate operation. The separation is preferably made with a rotating knife cylinder. The removed material can for example be burned or used as filler in various applications. Some plastic material could be recycled to for example a new sound insulation material.

Other Laminate Floor does not have any sound reduction material. Those types of floors are ready for next step in the process.

In this operation it is also possible to remove the melamine surface layer and the balancing layer. It is preferred however according to the disclosure to recycle the whole laminate floor panel including the surface layer 5 and the balancing layer 7.

The used laminate floor panels have different sizes that vary from small pieces up to plank sizes.

This material has to be reduced in size preferably to chips or particles of a size of 0.01-10 mm. The sizing can be done in different ways. Appropriate equipment is for example a knife or hammer mill where the size of the cut particles can be adjusted by changing the holes through which the separated particles can leave the cutting equipment.

The cut material particles comprise three types of material compositions as shown in FIG. 1d. Some particles are mainly wood fibers 14 or wood fiber chips, some comprise mainly parts (10,12) from the surface layer 5, such as mainly decorative paper 10, melamine flakes from the overlay 13 and aluminium oxide 12 particles and finally parts comprising melamine 15 from the balancing layer. All particles are preferably collected in a container for storing for next cutting step. Such first separation could be made at special collection stations.

The cutting of the used Laminate Floor can of course also be done in an ordinary MDF and HDF plant by using the normal production facilities.

If the particles comprising melamine are intended to be used in a new high quality board, it is preferred, as an alternative to cutting into small particles, to sand the surface layer and the balancing layer prior to separation.

A new board produced of an unsanded original laminate floor could have a lower bending strength and tensile strength compared to a new board produced of a sanded original laminate floor. The reason is that it is very difficult to bond the wood fibers to the smooth melamine surface portions. Sanding or cutting into small particles will increase the bonding between the melamine particles and the fibers.

The sanding operation could be done with a normal sanding machine, used in the wooden and laminate industry. The used sandpaper grit is around 80.

The particles could be further reduced in size to for example 0.01-1 mm with sieving and they could now be used as raw material in a board production.

The particles could also be separated into for example three different material types, mainly wood fibers 14 or wood fiber chips, mainly parts (10,12) from the surface layer 5, such as mainly decorative paper 10 and melamine flakes from the overlay 13 and aluminium oxide 12, and finally parts 15 comprising melamine from the balancing layer. These materials could be used separately to form a new board material or as filler or they could all be included in various parts of a new board material.

In order to form a board for a building panel or a laminate floor, fibers and chips of different kinds are mixed together with a binder in order to bond the fibers together and to give the board certain properties such as bending strength, tensile strength, and resistance against moisture etc.

The cutting into particles or chips results in different fractions of fibers that could be rather long fibers as in the original panel, smaller fibers and very small fibers or fiber powder. The fibers, which are impregnated with melamine and cured in the initial HDF process, are of a very high quality and very suitable to form for example surface layers in a floorboard. The chips comprising melamine and aluminium oxide have different properties. They could be used to form high density and wear resistant portions in the floorboard.

The fiber fractions and chips are mixed with a powder resin, e.g., melamine resin—Kauramin 772, preferably separately. This gives the possibility to form a board with different layers and different properties in the layers.

The amount of powder resin/melamine can vary from 5 up to 25-weight %. To produce a normal board for a laminate floor, 10 to 15 weight % is preferred. The mixing of fibers and (melamine) powder resin can be done in a tank with a paint stirrer. The mixing time could be around 5 min.

When the different fibers are mixed with powder melamine resin, the different fractions are stored in separately storing containers.

Other types of resins are of course possible to use, e.g., melamine/urea resins and phenol resins are all possible to use in powder shape or in liquid conditions.

Using powder resins makes it easy to mix the different types of fibers and chips with natural wood chips or glass fiber. This is a dry process. No energy is needed for drying.

When using resins in a solution, the resin has to be applied by, e.g., spraying. Then the coated fibers have to be dried and energy has to be added.

In this stage of the process it is also possible to add other types of fibers, e.g., virgin fiber or the type of fibers that are used for manufacturing of MDF or HDF. Those fibers could be mixed with, e.g., powder melamine resin and stored in a separate container.

FIG. 2a shows a preferred production method to produce the wood fiberboard according to the disclosure. A first layer 6 comprising all particles from the recycled laminate floor mixed with a binder is applied on a conveyor belt 20. The production method could preferably and optionally comprise an intermediate pressing step, where the wood fibers are partly compressed with a roller 21 or with a continuous pressing equipment or a similar device. The fibers are preferably not cured, at least not completely, in this production step.

The prepressed layers are thereafter pressed under heat and pressure in a preferably continuous press 23 and the fibers and chips are bonded together with the binder, which cures under heat and pressure to a board material. All parts of the laminate flooring have been reused. A discontinuous press with one or several openings could also be used.

The binder is preferably a melamine-formaldehyde resin. The pressure is preferably about 300N-800 N/cm$^2$ and the temperature could be 120-220 degrees C. The pressing time could vary for example from 20 seconds to 5 minutes depending on the production speed, panel thickness, binders etc. The density of the board is preferably 700-1000 kg/m$^3$. It is possible to produce very moisture and impact resistant board material with a density of 1000-1500 kg/m$^3$.

Figure 2B:
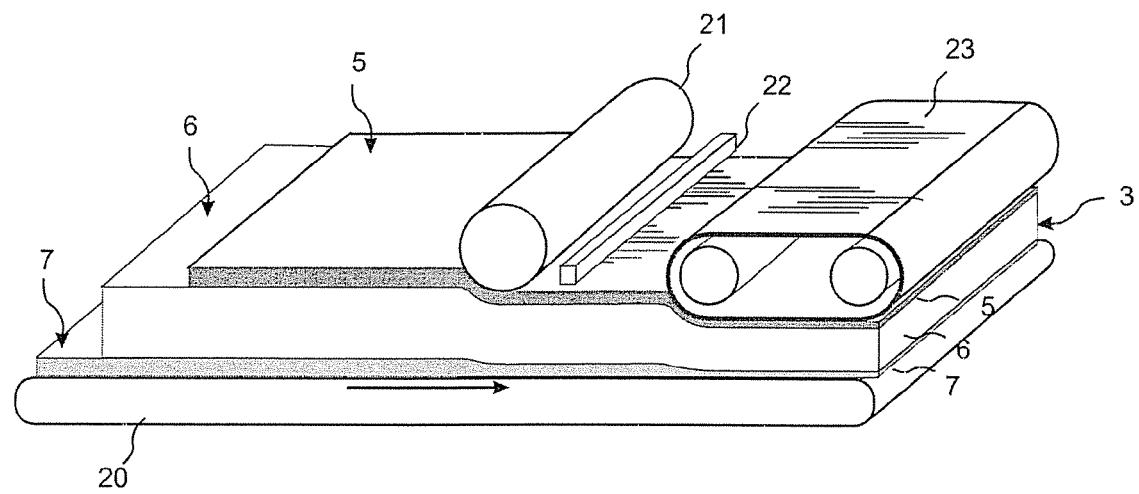

FIG. 2b shows a production method to produce the wood fiber floor panel according to another principle of the disclosure. In this case recycled particles or chips only or recycled particles mixed with virgin fibers could be used. A first layer 7 comprising the balancing layer is applied on a conveyor 20. A second layer 6 comprising the core layer is applied on the balancing layer. These two layers comprise preferably wood fibers and a binder only. A third layer, the surface layer 5, is applied on the core layer 6. The surface layer 5 comprises wood fibers, a binder and wear resistant particles. The surface layer 5 could also comprise colour pigments that could give the surface layer a basic colour. The production method could preferably comprise an intermediate pressing step, where the wood fibers are partly compressed with a roller 21 or with continuous pressing equipment or a similar device. The fibers are preferably not cured, at least not completely, at this production step.

Printing with for example an ink jet printer 22 or other type of production equipment that gives the surface layer 5 decorative features could optionally be used in line with the production of the floorboard. The printing is preferably made on a pre pressed surface. The pre pressed layers are after printing pressed under heat and pressure and the fibers and the wear resistant particles are bonded together with the binder, which cures under heat and pressure and a hard surface layer is obtained.

The binder is even here preferably a melamine-formaldehyde resin. The pressure is preferably also about 300N-800 N/cm$^2$ and the temperature could be 120-220 degrees C. The pressing time could vary for example from 20 seconds to 5 minutes depending on the production speed, panel thickness, binders etc. The density of the floorboard is preferably 700-1000 kg/m$^3$. It is possible to produce very moisture and impact resistant floorboards with a density of 1000-1500 kg/m$^3$.

The floorboard could be used to form a floor panel without any additional layers. Alternatively laminated layers, paint, print etc could be applied as additional surface layers.

Figure 3A:
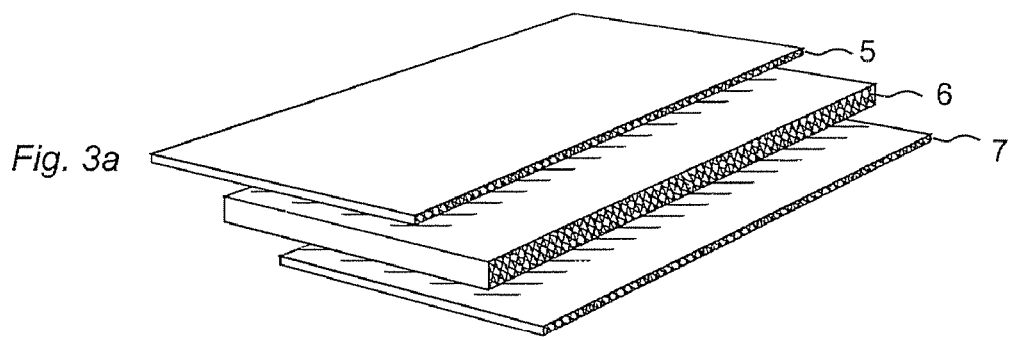
FIGS. 3a-d show a production method according to an embodiment of the invention.
Figure 3B:
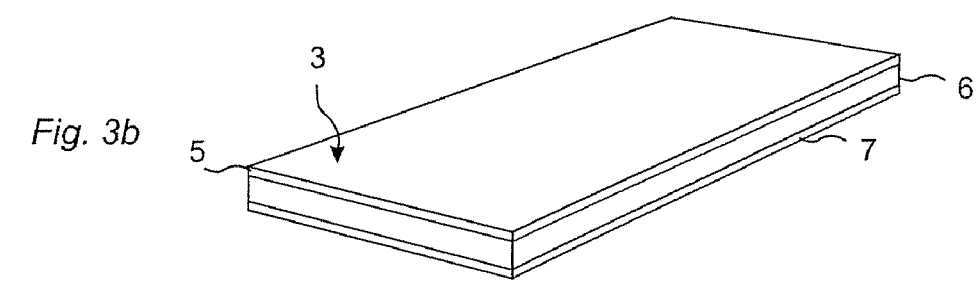
Figure 3C:
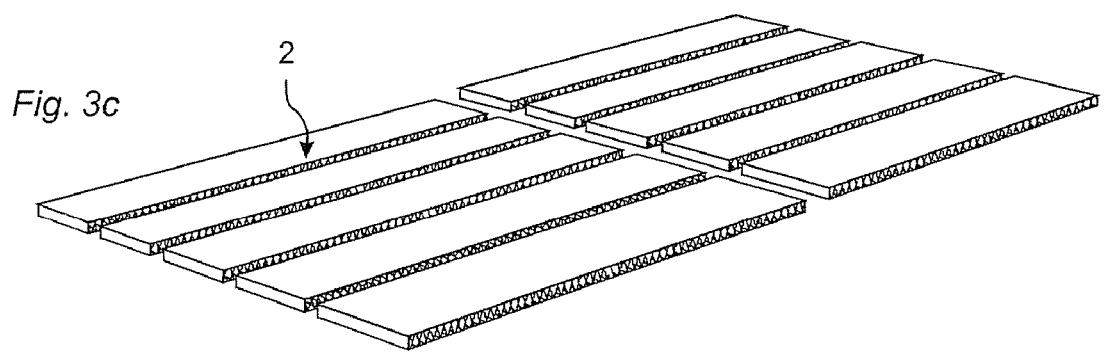
Figure 3D:
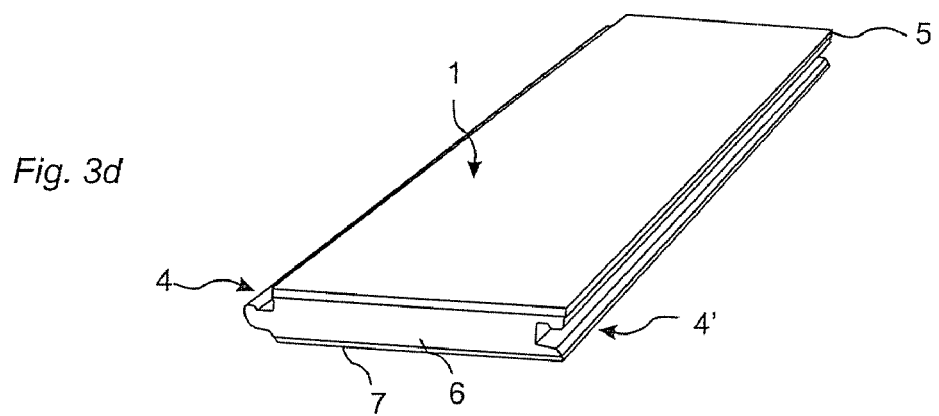

It is preferred to produce the whole floorboard in a continuous process. It is however possible to make the floorboard in several steps as shown in FIGS. 3a-3d. A separate surface layer 5 or a core layer 6 and even a balancing layer 7 could be produced according to the disclosure and as shown in FIG. 3a and these layers could be connected with glue. The most preferred method is however to produce the core 6 with the recycled materials and to apply surface layers the core 6. A balancing layer 7 could also be applied. A surface layer 5 and a balancing layer 7 comprising recycled materials could also be applied directly to a core of for example HDF and these three layers could be pressed continuously or in a discontinuous press to a floorboard 3.

The floorboard 3 is generally in all of the alternatives described above cut into individual floor elements 2 and their edges are generally machined and formed to floor panels with mechanical locking systems 4, 4'. All known locking systems allowing locking with angling, horizontal and vertical snapping, side push etc could be used.

Individual floor elements 2 or floor panels 1 could also be produced and parts of the locking system could for example be formed in the pressing operation. Tile and stone shaped products could also be produced without any locking systems and they could be installed in the traditional way by gluing to the sub floor.

The invention should not be considered as limited by the above description; rather the scope and limitations of the invention are defined by the enclosed claims, and equivalents thereof.

The invention claim is:

1. A method to recycle laminate floor panels including a wood fiber based core, a decorative surface layer that includes a thermosetting resin and aluminium oxide, the method comprises:
   a) mechanical cutting of the panel into particles;
   b) mixing said particles with a binder; and
   c) pressing the mixed particles and binder and thereby forming a sheet shaped material,
   wherein the method comprises mixing said particles with a melamine formaldehyde resin.

2. A method to recycle laminate floor panels including a wood fiber based core, a decorative surface layer that includes a thermosetting resin and aluminium oxide, the method comprises:
   a) mechanical cutting of the panel into particles;
   b) mixing said particles with a binder; and
   c) pressing the mixed particles and binder and thereby forming a sheet shaped material,
   wherein the pressing is made under heat,
   wherein the method comprises mixing said particles with a melamine formaldehyde resin.

3. A method to recycle laminate floor panels including a wood fiber based core, a decorative surface layer that includes a thermosetting resin and aluminium oxide, the method comprises:
   a) mechanical cutting of the panel into particles;
   b) mixing said particles with a binder; and
   c) pressing the mixed particles and binder and thereby forming a sheet shaped material,
   wherein the method further comprises separating particles essentially into a first set of particles comprising substantially wood fibers and a second set of particles comprising substantially melamine before mixing at least the first set of elements with a binder.

4. A method to recycle laminate floor panels including a wood fiber based core, a decorative surface layer that includes a thermosetting resin and aluminium oxide, the method comprises:
   a) mechanical cutting of the panel into particles;
   b) mixing said particles with a binder; and
   c) pressing the mixed particles and binder and thereby forming a sheet shaped material,
   wherein the pressing is made under heat,
   wherein the method further comprises separating particles essentially into a first set of particles comprising substantially wood fibers and a second set of particles comprising substantially melamine before mixing at least the first set of elements with a binder.

5. The method as claimed in claim 1, wherein the method further comprises separating particles essentially into a first set of particles comprising substantially wood fibers and a second set of particles comprising substantially melamine before mixing at least the first set of elements with a binder.

6. The method as claimed in claim 2, wherein the method further comprises separating particles essentially into a first set of particles comprising substantially wood fibers and a second set of particles comprising substantially melamine before mixing at least the first set of elements with a binder.

* * * * *